United States Patent [19]

Shultz, Jr.

[11] 4,291,467

[45] Sep. 29, 1981

[54] GUIDE RULE FOR AUTOMOBILE MOULDING OR THE LIKE

[76] Inventor: William L. Shultz, Jr., 732 N. Third Ave., Villa Park, Ill. 60181

[21] Appl. No.: 101,278

[22] Filed: Dec. 7, 1979

Related U.S. Application Data

[63] Continuation of Ser. No. 950,151, Oct. 10, 1978, abandoned.

[51] Int. Cl.³ .......................... G01B 3/14; G01B 3/10

[52] U.S. Cl. .......................... 33/177; 33/174 G; 33/180 AT; 33/DIG. 1

[58] Field of Search .................. 33/1 G, 137 R, 174 G, 33/176, 177, 180 AT, 189, DIG. 1

[56] References Cited

U.S. PATENT DOCUMENTS

| | | | |
|---|---|---|---|
| 694,061 | 2/1902 | Hunt | 33/177 |
| 1,233,382 | 7/1917 | Malsin | 33/176 |
| 2,692,437 | 10/1954 | Cook | 33/138 |
| 2,790,245 | 4/1957 | Wilkes | 33/177 |
| 3,139,003 | 6/1964 | Magor | 33/174 G |
| 3,407,507 | 10/1968 | Brubaker | 33/137 R |
| 3,416,235 | 12/1968 | Spilker | 33/DIG. 1 |
| 3,724,083 | 4/1973 | Mehl | 33/177 |

FOREIGN PATENT DOCUMENTS

| | | | |
|---|---|---|---|
| 698643 | 10/1953 | United Kingdom | 33/174 G |

*Primary Examiner*—Richard R. Stearns
*Attorney, Agent, or Firm*—Trexler, Bushnell & Wolters, Ltd.

[57] ABSTRACT

The disclosure relates to a guide rule for aligning and facilitating mounting of a protective side moulding to a side panel of a vehicle, with said side moulding in a substantially straight line orientation. The guide rule includes a continuous elongated strip of flexible magnetic material, preferably of the type having a plurality of magnetized particles embedded in or impregnated in an elastomeric material, said strip being of a first thickness, and an elongated strip of metallic material, preferably spring steel, laminated to the flexible strip. The metallic strip is provided with substantially linear, parallel elongate edges and has a width dimension which is at least equal to the width dimension of the flexible strip, and a thickness substantially less than the thickness of said flexible strip. The magnetized flexible strip provides means for securely attaching the guide rule to an auto side panel, and the metallic strip provides a rigid, rectilinear support surface for the side moulding. In addition, the construction of the metallic strip of spring steel, provides means for assuring substantially straight line orientation, as the flexible magnetic strip and the metallic strip will tend to bow outwardly if mounted to a surface in other than linear orientation.

5 Claims, 5 Drawing Figures

GUIDE RULE FOR AUTOMOBILE MOULDING OR THE LIKE

This is a continuation of application Ser. No. 950,151, filed Oct. 10, 1978, now abandoned.

BACKGROUND OF THE INVENTION

The present invention is generally directed to a guide rule, and more particularly, to a guide rule construction for facilitating alignment and mounting of a protective side moulding along a metallic surface such as a side panel of a vehicle in a substantially straight line orientation.

As well known, many automobiles come equipped with protective side mouldings along their side panels either as standard equipment or optional equipment. The protective side mouldings prevent paint chipping or small dents in the automobile's side panels as a result of impact from carelessly open doors of an adjacent vehicle or the like. These side mouldings generally include an elongate metal base to which is mounted a plastic or rubber bumper element. These mouldings are often incorporated into the overall aesthetic appearance of the car and as such it is desirable that they be mounted in proper, linear orientation.

The side mouldings of this general type have taken two different forms. Most recently, the side moulding is adhered to the side panel of the automobile with a double sided adhesive tape or directly with an adhesive material. The earlier other forms of mouldings found on older cars, are secured to the side panel of the automobile through the use of fasteners mounted to the moulding base and received in holes drilled into the automobile side panel.

The styling of automobiles customarily dictate that the side moulding be oriented on the side panels of the automobiles in a substantially straight line. Thus, when the side mouldings are applied to the automobiles at the factory or as an after market item, it is desirable to orientate the side moulding in a substantially straight line in order to preserve the overall styling and aesthetics of the original design. Additionally, if it becomes necessary that body work be performed on the side panels of the automobiles equipped with protective side mouldings, it is customarily necessary to remove the side mouldings, and thereafter replace or remount them when the body work is completed.

It is therefore a general object of the present invention to provide a new and improved guide rule for aligning a protective side moulding along a metallic surface such as a side panel of a vehicle in a substantially rectilinear orientation.

It is a more particular object of the present invention to provide a guide rule which insures orientation in substantially a rectilinear mode, without precise, time consuming measurement, thereby facilitating the overall mounting operation.

It is a still particular object of the present invention to provide a guide rule for aligning a protective side moulding along a side panel of a vehicle in a substantially rectilinear orientation to facilitate the securing of the moulding thereto wherein the guide rule includes means for releasably securing it to the side panel and also means for forcing the guide rule into a substantially rectilinear orientation when the guide rule is in broad surface contact with the side panel.

It is a still further particular object of the present invention to provide such a guide rule which includes a continuous rigid rectilinear support surface for the side moulding for maintaining the side moulding in its desired position during the set up period for the adhesive material which secures the side moulding to the side panel.

The invention as disclosed in the drawings and as to be discussed hereof therefore provides a novel guide rule construction for aligning and mounting a protective side moulding along a metallic surface such as a side panel of a vehicle in a substantially rectilinear orientation. The guide rule includes a continuous or uniform elongated strip of flexible material, preferably formed from an elastomeric or plastic material, and having a plurality of magnetized particles impregnated therein to render said strip magnetic. In addition, the guide rule also includes an elongated metallic strip of spring metal material laminated or secured to the flexible magnetic strip. The metallic strip has at least one rectilinear edge, and a width dimension which is at least equal to the width dimension of the flexible strip and a thickness which is substantially less than the thickness of the flexible strip. The magnetic nature of the flexible strip provides for securely attaching the guide rule to the side panel, while the edge of the metallic strip provides a continuous rectilinear, rigid support surface for the side moulding. Further, the spring nature of the metallic strip and its bond to the flexible strip, providing means for forcing the guide rule into a substantially straight line orientation when the guide rule is in broad uniform surface contact with the side panel, thus facilitating proper alignment without precise measurement.

BRIEF DESCRIPTION OF THE DRAWINGS

The features of the present invention which are believed to be novel are set forth with particularity in the appended claims. The objects and further advantages thereof, however, may best be understood by making reference to the following description taken in conjunction with the accompanying dawings, and the several figures of which like reference numerals indicate indentical elements, and wherein:

DESCRIPTION OF THE PREFERRED EMBODIMENT

Figure 1:
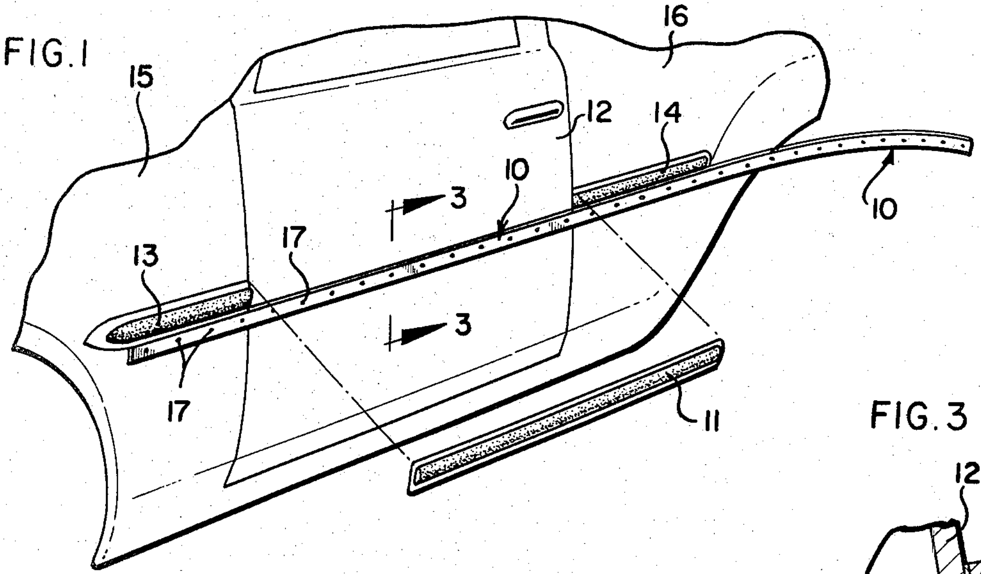
FIG. 1 is a partial perspective side view, illustrating the manner in which a guide rule embodying the present invention may be utilized for aligning a protective side moulding along a side panel of a vehicle.

Referring now to FIG. 1, said figure illustrates the manner in which a guide rule 10 embodying the present invention may be utilized for aligning and mounting a protective side moulding 11 to a side panel of a vehicle in a substantially straight line orientation. The side panel, in this case, takes the form of a vehicle side door 12, and the moulding 11 is of the type which will be secured by adhesive material to said door 12. The side moulding section 11 must be oriented in a rectilinear or straight line position between a pair of adjacent side moulding sections 13 and 14 which are already secured to respective side panels 15 and 16, as might occur subsequent to repair of a damaged door panel 12.

Figure 3:
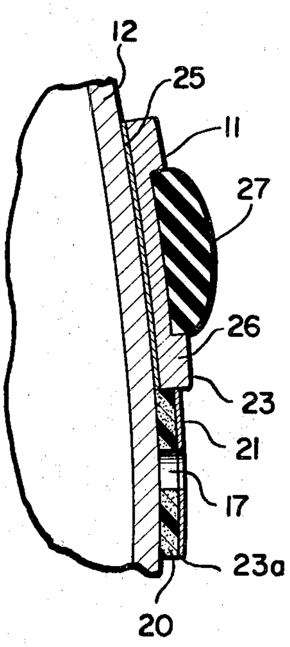
FIG. 3 is a cross-sectional view taken along lines 3—3 of FIG. 1, with the moulding in place.
Figure 5:
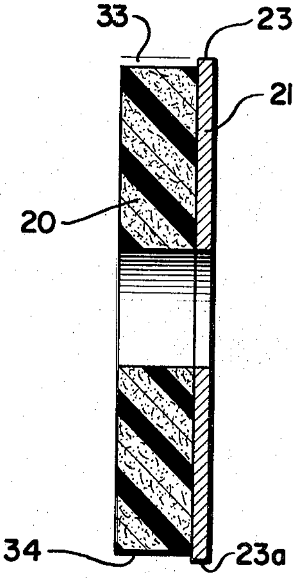
FIG. 5 is an enlarged cross-sectional view of a guide rule embodying the present invention.

The guide rule 10, as can be best seen in the cross-sectional views of FIGS. 3 and 5, includes an elongate magnetic strip of flexible material 20 and an elongated strip of metallic material 21 laminated to the flexible strip 20 to be carried thereby. In addition, the rule 10 includes a plurality of apertures 17 which extend through both the flexible strip 20 and the metallic strip 21 for a purpose to be described.

The flexible strip 20 is preferably magnetic, being formed from an elastomeric or plastic like material impregnated with magnetic particles. The magnetic properties of the strip 20 provide means for releasably securing the guide rule 10 to the side panel 12. The metallic strip 21 is preferably and advantageously formed from spring steel. Further said strip 21 has a width dimension defined by rectilinear, parallel edges 23 and 23*a*, which is equal to or greater than the width dimension of the flexible strip 20. Also, as can be clearly seen, the thickness of the flexible strip 20 is substantially greater than the thickness of the metallic strip 21.

The flexible magnetic strip 20 and the metallic strip 21 are uniform or continuous throughout their entire, respective lengths, which is to be contrasted with segmented guides as may be found in the prior art. As will be explained hereinafter with regard to the discussion concerning use of the rule 10, this continuous or uniform construction provides a number of important, unexpected advantages.

The side moulding 11 as shown in FIGS. 1 and 3 is of the type which is secured to the side panel 12 by an adhesive material 25, shown between the body side panel 12 and the protective moulding 11. In this regard, the adhesive means 25 used to secure the moulding 11 in place may be adhesive, per se, or a double sided adhesively coated tape. A typical moulding section 11, as shown includes a metallic base 26, to which is secured an elongate bumper element 27.

Directing attention now to FIGS. 1 and 3, one manner of use of the guide rule 10 will be considered. In this regard, it is assumed that the door panel 12 has been repaired, and as the final step, moulding section 11 is to be applied, and it can be appreciated that in order to maintain the aesthetics of the design, that said section 11 should be aligned with the forward and rear moulding sections 13 and 14.

In use, the guide rule 10 is engaged in abutment with the lower edges of the mounted, rear and forward sections 13 and 14 and secured to the side panel 12. The substantial thickness of the flexible strip 20 and rectilinear support surface provided by edge 23 of the spring metal strip 21 provide an elongate support surface for the side moulding section 11. The side moulding 11 may then be affixed to the side panel 12 by the adhesive means 25, with the engagement of said moulding section 11 with the rectilinear support surface 23 assuring that said section 11 will be orientated in a straight line with respect to moulding sections 13 and 14. Once applied to the side panel 12, the side moulding 11 continues to be supported by the guide rule 10 until the adhesive means 25 has set thoroughly. In this regard, it should be noted that the guide rule 10 provides continuous support for the moulding 11 along the entire length threof, and thereby prevents the moulding from slipping or moving out of alignment under its own weight. Once the adhesive means 25 has set, the guide rule 10 may be readily released from the side panel merely by pulling outwardly to counteract the magnetic attraction between the magnetic strip 20 and the side panel 12.

Figure 2:
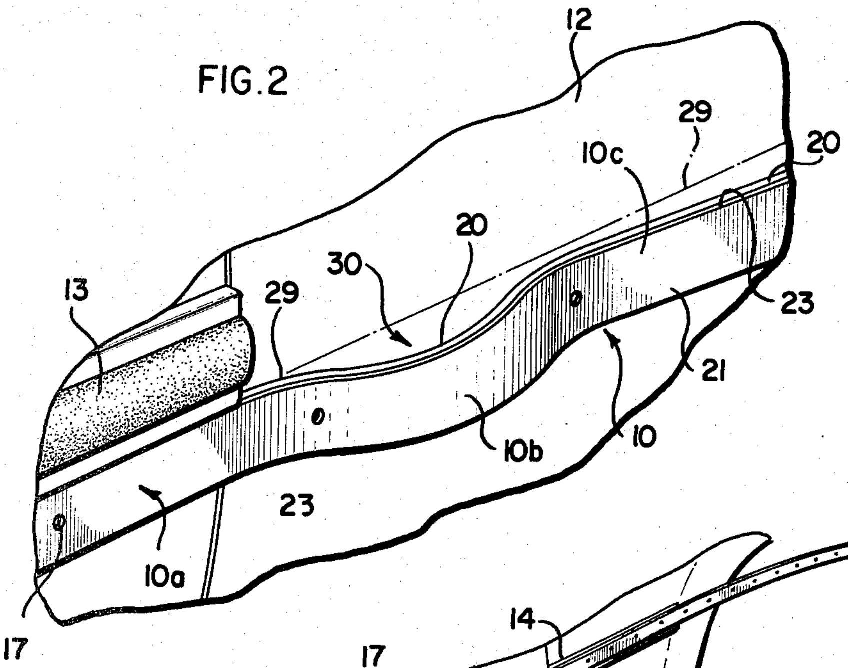
FIG. 2 is an enlarged, partial perspective view of a guide rule embodying the present invention and illustrating what occurs when the rule is aligned other than in substantial straight line orientation along a side panel.

There is an extremely important feature of the guide rule 10 of the present invention that will now be discussed, which feature insures that the rectilinear support edge 23 of said guide rule 10, is disposed the proper desired alignment. It will be recalled that the metallic strip 21 is formed of a spring steel material (numerous suitable types of which are known) and is continuous, that is extends uniformly along substantially the entire length of the flexible magnetic strip 20. With reference to FIG. 2, it should be noted that there is shown a datum line 29, which represents the desired alignment for the upper support edge 23 of said guide rule 10 and corresponds generally to the lower edge of the forward moulding section 13. Accordingly, in use a forward portion 10*a* of the guide may be abutted against the lower edge of the existing or prior mounted moulding section 13, thereby aligning the edge 23 in the area of said forward guide rule portion 10*a* with the datum line 29. Should the remainder of the guide rule 10 be in proper position, i.e. the rectilinear edge 23 aligned with datum rule 29, the flexible strip 20 will be in flush, face-to-face contact with the door panel 12, as illustrated in FIG. 1. If, however, as is shown in FIG. 2, a rear portion 10*c* is not in proper alignment, the intermediate rule portion 10*b* will bulge outwardly, as indicated at 30. As such, the flexible strip portion 20 in area of portion 10*b* will not engage the door panel. Thus, to insure proper alignment of the edge 23 of the guide rule 10, the installer need only, adjust the rear or intermediate guide rule portions 10*b* and 10*c* to attain full, face-to-face engagement of the flexible magnetic strip 20 along the extent of the door panel 12 to which moulding section 13 is to be attached. As such, the need for precise measurement is eliminated, and not only does the guide rule 10 of the invention insures proper alignment of the moulding strip 11, but permits said proper mounting to be attained more expediously.

The structural elements or design of the guide rule 10 which give use to the above discussed feature, will now be considered. In this regard, it will be recalled that the metallic strip 21 is formed from flexible, spring steel, or the like, and is continuous or uniform in its attachment to and extent along, the flexible member 20. Further, the metallic strip 21 is designed such that the edge 23 is rectilinear and extends to or beyond the edges 33 and 34, FIG. 5, of the flexible magnetic member 20. Thus, when a given section of the guide rule, such as section 10*a* is secured in position, the magnetic attraction provided by the flexible strip 20 tends to maintain the edge 23 in alignment with the desired datum line 29. If an adjacent portion 10*b* or 10*c* is engaged out of alignment, said misalignment will be resisted by the spring characteristics of the metal strip 21. Further, since strip 21 is continuous and uniform, the spring characteristics thereof will produce a twisting movement in the strip 21 proximate the area of misalignment. This movement will pull the guide rule 10 away from the surface of panel 12, thus interrupting the surface-to-surface engagement of flexible strip 20 and panel 12 in the general area of misalignment. It is realized, of course, that the degree of magnetic attraction provided by the flexible strip 20 is selected such that it will be overcome by said twisting movement upon misalignment. Accordingly, once an installer aligns the guide rule 10 with respect to the extremities of the panel portion to be bridged by the moulding section, as for example by abutting said guide rule 10 against the previously mounted moulding section 13 and 14; and check to see that the guide is in flush engagement with the panel 12, it is assured that the guide rule is in proper rectilinear position.

Figure 4:
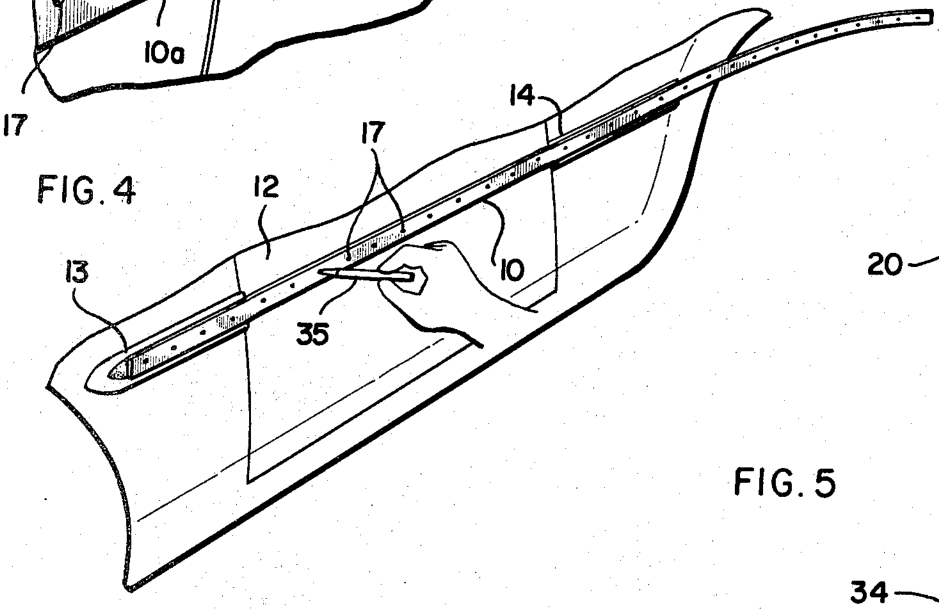
FIG. 4 is a partial perspective view illustrating the manner in which a guide rule embodying the present invention may be utilized for locating the position of holes to be drilled in a side panel of a vehicle to facilitate the securing of a side moulding to the side panel with fasteners.

FIG. 4 shows how the guide rule of the present invention may be utilized in securing a section of side moulding (not shown) to a side panel wherein the side moulding is of the type adapted to be secured by use of fasteners or clips which are engaged in holes drilled into the side panel. Here, it is only necessary to mount the guide rule 10 between the adjacent side mouldings 13 and 14, as shown. Because of the construction of the guide rule 10, as previously described, it can be appreciated that the guide rule will assume a straight line orientation between the side mouldings 13 and 14. The apertures 17 are preferably aligned and equally spaced in a known manner consistent with the position of the fasteners to be used on the moulding to be secured to the side panel door 12.

Once the guide rule has been applied as shown, a pencil 35 may be utilized for scribing on the side panel 12, through the apertures, the position of the holes to be drilled into the side panel 12, which holes are to receive the fasteners to secure the side moulding to the side panel. Preferably, the apertures are arranged on a line equidistant between the side edges of the guide rule so that the holes which result from the drilling process will be centered with respect to the side edges of the moulding to be secured to the side panel.

Thus, it can be seen that the present invention provides a new and improved guide rule for aligning a protective side moulding along a metallic surface such as a side panel of a vehicle in a substantially straight line orientation. The guide rule of the present invention not only provides an adequate support for the side moulding as it is secured to the side panel but additionally automatically assumes a straight line orientation along the side panel when applied. As a result, the guide rule of the present invention is particularly adapted for use in an assembly line environment where efficiency is a premium. However, the guide rule of the present invention is also suitable for use in any environment wherein it is necessary to apply side mouldings to a metallic surface such as the side panel of a vehicle.

While particular embodiments of the present invention have been shown and described, modifications may be made, and it is intended in the appended claims to cover all such changes and modifications which fall within the true spirit and scope of the invention.

The invention is claimed as follows:

1. A guide rule for aligning a protective side moulding, or the like, along a metallic surface such as a side panel of a vehicle, or the like, in a substantially rectilinear orientation thereby to facilitate the securing of the moulding thereto, said guide rule comprising; an elongate strip of flexible magnetic material, and an elongate strip of spring steel material fixedly secured to said flexible strip in surface-to-surface engagement along substantially the entire length of said elongate strip of magnetic material so that relative lateral and longitudinal movement between said elongate strip of magnetic material and said strip of spring steel material is precluded, said metal strip having at least one edge which extends beyond the adjacent side edge of said flexible strip for the entire length of said metallic strip said flexible magnetic strip providing means for securely attaching the guide rule to the side panel, and said metallic strip edge providing a continous rigid, rectilinear support surface for the side moulding, with the construction of said metallic strip from flexible spring steel and the fixed securement of said spring steel strip to said strip of flexible magnetic material providing means which force the guide rule into a substantially rectilinear orientation when the elongate strip of flexible magnetic material is in surface-to-surface contact with a metallic surface.

2. A guide rule for aligning a protective side moulding, or the like, along a metallic surface such as a side panel of a vehicle, or the like, in a substantially rectilinear orientation thereby to facilitate the securing of the moulding thereto, said guide rule comprising; an elongate strip of flexible magnetic material, and an elongate strip of spring steel material fixedly secured to said flexible strip in surface-to-surface engagement along substantially the entire length of said elongate strip of magnetic material so that relative lateral and longitudinal movement between said elongate strip of magnetic material and said strip of spring steel material is precluded, said metal strip having at least one rectilinear edge, which edge extends at least to the corresponding edge of the flexible magnetic strip, said flexible strip and said metallic strip include a plurality of aligned and equally spaced apertures along the length of said strips for providing means for locating the position of holes to be drilled into the side panel adapted to receive securing means which secure the side moulding to the side panel said flexible magnetic strip providing means for securely attaching the guide rule to the side panel, and said metallic strip edge providing a continuous rigid, rectilinear support surface for the side moulding, with the construction of said metallic strip from flexible spring steel and the fixed securement of said spring steel strip to said strip of flexible magnetic material providing means which force the guide rule into a substantially rectilinear orientation when the elongate strip of flexible magnetic material is in surface-to-surface contact with a metallic surface.

3. A guide rule for aligning a protective side moulding, or the like, along a metallic surface such as a side panel of a vehicle, or the like, in a substantially rectilinear orientation thereby to facilitate the securing of the moulding thereto, said guide rule comprising a continuous elongate strip of flexible magnetic material, and an elongate strip of spring steel material fixedly secured to said flexible strip in surface-to-surface engagement along substantially the entire length of said elongate strip of magnetic material so that relative lateral and longitudinal movement between said elongate strip of magnetic material and said strip of spring steel material is precluded, said elongate strip of flexible magnetic material extending across the width of said strip of spring steel material, but not beyond the edges of said spring steel strip, said spring steel strip having at least one rectilinear edge, which edge extends at least to the corresponding edge of the flexible magnetic strip, said flexible magnetic strip providing means for securely attaching the guide rule to the side panel, and said metallic strip edge providing a continuous rigid, rectilinear support surface for the side moulding, with the construction of said metallic strip from flexible spring steel and the fixed securement of said spring steel strip to said strip of flexible magnetic material providing means which force the guide rule into a substantially rectilinear orientation when the elongate strip of flexible magnetic material is in surface-to-surface contact with a metallic surface.

4. A method of aligning a protective side moulding, or the like, along a metallic surface such as a side panel of a vehicle, or the like in a substantially rectilinear orientation, said method comprising the steps of:

providing a guide rule including an elongate strip of flexible magnetic material and an elongate strip of spring steel material fixedly secured to said flexible strip against relative lateral and longitudinal movement therewith, with said metal strip having at least one exposed rectilinear support edge and being arranged to force said guide rule into a substantially rectilinear orientation when said guide rule is applied to a metallic surface;

applying said guide rule to the metallic surface with said magnetic flexible strip in surface-to-surface contact with the metallic surface;

positioning said guide rule so that said metal strip support edge coincides with the desired location for the bottom edge of the protective moulding; and thereafter applying the protective side moulding to the metallic surface with the bottom edge thereof in support engagement with said metallic strip support edge.

5. A method of applying a protective side moulding, or the like, to a metallic surface such as a side panel of a vehicle, or the like, and substantially rectilinear alignment, said method comprising the steps:

providing a guide rule including an elongate strip of flexible magnetic material and an elongate strip of spring steel material fixedly secured to said flexible strip against relative lateral and longitudinal movement therewith, with said metal strip having at least one exposed rectilinear support edge and being arranged to force said guide rule into a substantially rectilinear orientation when said guide rule is applied to a metallic surface;

applying said guide rule to the metallic surface with said magnetic flexible strip in surface-to-surface contact with the metallic surface;

positioning said guide rule so that said metallic strip support edge coincides with the desired location for the bottom edge of the protective moulding;

applying the protective side moulding to the metallic surface with the bottom edge thereof in supported engagement with the metallic strip support edge;

securing the protective side moulding to the metallic surface; and thereafter pulling the guide rule from the metallic surface so as to counteract the magnetic attraction between the flexible magnetic strip and the metallic surface.

* * * * *